(12) United States Patent
Yasui et al.

(10) Patent No.: US 11,058,983 B2
(45) Date of Patent: Jul. 13, 2021

(54) HONEYCOMB FILTER

(71) Applicant: NGK INSULATORS, LTD., Nagoya (JP)

(72) Inventors: Osamu Yasui, Nagoya (JP); Takashi Aoki, Nagoya (JP); Kazuto Miura, Nagoya (JP); Tomohiro Iida, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 477 days.

(21) Appl. No.: 15/935,423

(22) Filed: Mar. 26, 2018

(65) Prior Publication Data
US 2018/0280859 A1    Oct. 4, 2018

(30) Foreign Application Priority Data

Mar. 30, 2017   (JP) .............................. JP2017-068047

(51) Int. Cl.
*B01D 46/24* (2006.01)
*F01N 3/022* (2006.01)
*F01N 3/035* (2006.01)

(52) U.S. Cl.
CPC ....... *B01D 46/2474* (2013.01); *B01D 46/247* (2013.01); *B01D 2046/2433* (2013.01);
(Continued)

(58) Field of Classification Search
CPC .............. B01D 46/247; B01D 46/2474; B01D 2046/2433; F01N 3/022; F01N 3/0222; F01N 2330/06; F01N 2330/34
See application file for complete search history.

(56) References Cited

U.S. PATENT DOCUMENTS

2002/0192426 A1* 12/2002 Ichikawa ............. B01D 53/885
428/116
2004/0258582 A1 12/2004 Miwa et al.
(Continued)

FOREIGN PATENT DOCUMENTS

CN    1392803 A    1/2003
CN    103458991 A    12/2013
(Continued)

OTHER PUBLICATIONS

Chinese Office Action, Chinese Application No. 201810261813.4, dated Dec. 4, 2020 (7 pages).
(Continued)

*Primary Examiner* — Lucas A Stelling
*Assistant Examiner* — Hafiz Muhammad Aamir
(74) *Attorney, Agent, or Firm* — Burr & Brown, PLLC

(57) ABSTRACT

Provided is a honeycomb filter, including: a pillar-shaped honeycomb substrate having an inflow end face and an outflow end face and including a porous partition wall surrounding a plurality of cells; and a plugging portion disposed at any one of ends of the cells at the inflow end face and at the outflow end face. In a cross section orthogonal to an extending direction of the cells, inflow cells have a pentagonal or a hexagonal shape, and outflow cells have a square shape. The cells are configured that the inflow cells surround one outflow cell and one side of an inflow cell and one side of an adjacent outflow cell are parallel to each other. The partition wall is configured that thickness of a first partition wall disposed between the inflow cells and the outflow cells is smaller than thickness of a second partition wall disposed between the inflow cells.

10 Claims, 7 Drawing Sheets

(52) U.S. Cl.
   CPC ............. *B01D 2046/2481* (2013.01); *B01D 2046/2492* (2013.01); *B01D 2046/2496* (2013.01)

(56) References Cited

U.S. PATENT DOCUMENTS

| | | |
|---|---|---|
| 2007/0180804 A1 | 8/2007 | Mizutani |
| 2007/0240396 A1 | 10/2007 | Mizutani |
| 2014/0123611 A1 | 5/2014 | Toyoshima et al. |
| 2014/0298779 A1* | 10/2014 | Miyairi ............... F01N 3/022 60/298 |
| 2017/0014747 A1 | 1/2017 | Miyairi |

FOREIGN PATENT DOCUMENTS

| | | |
|---|---|---|
| EP | 2 554 234 A1 | 2/2013 |
| JP | 2007-209842 A1 | 8/2007 |
| JP | 4279497 B2 | 6/2009 |
| JP | 4567674 B2 | 10/2010 |
| JP | 2011-167641 A | 9/2011 |
| JP | 2012-081415 A1 | 4/2012 |
| JP | 2014-200741 A1 | 10/2014 |
| JP | 2017-023919 A | 2/2017 |
| WO | 2011/125769 A1 | 10/2011 |

OTHER PUBLICATIONS

Japanese Office Action (with English translation), Japanese Application No. 2017-068047, dated Nov. 10, 2020 (8 pages).
Japanese Office Action (with English translation), Japanese Application No. 2017-068047, dated Jan. 6, 2021 (9 pages).

\* cited by examiner

HONEYCOMB FILTER

"The present application is an application based on JP-2017-068047 filed on Mar. 30, 2017 with Japan Patent Office, the entire contents of which are incorporated herein by reference."

BACKGROUND OF THE INVENTION

Field of the Invention

The present invention relates to honeycomb filters. More specifically the present invention relates to a honeycomb filter having low pressure loss while maintaining the isostatic strength.

Description of the Related Art

Internal combustion engines are used as a power source in various industries. Exhaust gas emitted from such an internal combustion engine during burning of the fuel, however, contains particulate matters, such as soot and ash, together with toxic gas, such as nitrogen oxides. Hereinafter the particulate matters may be called "PMs". "PM" stands for "Particulate Matter". Regulations on the removal of PMs emitted from a diesel engine are becoming stricter worldwide. A honeycomb-structured wall flow type filter, for example, has been used for a filter to remove such PMs.

For such a wall-flow type filter, various types of honeycomb filters have been proposed, which includes a honeycomb substrate having a porous partition wall that defines a plurality of cells serving as a through channel of fluid, and a plugging portion disposed at the open ends of the plurality of cells on any one side (see Patent Documents 1 to 4, for example). For example, such a honeycomb filter has inflow cells having a plugging portion at their outflow end faces and outflow cells having a plugging portion at their inflow end faces, the inflow cells and the outflow cells being disposed alternately via the partition wall. The porous partition wall serves as a filter to remove PMs.

One of the proposed wall-flow type honeycomb filters is configured to have a shape of the cells that is a combination of hexagons and squares in a cross section orthogonal to the center axis direction of the honeycomb structure body (Patent Document 5, for example). Such a honeycomb filter has excellent strength in high temperature and can have reduced pressure loss.

[Patent Document 1] JP-A-2007-209842
[Patent Document 2] JP-A-2012-081415
[Patent Document 3] JP-B-4279497
[Patent Document 4] JP-B-4567674
[Patent Document 5] JP-A-2014-200741

SUMMARY OF THE INVENTION

The honeycomb filter described in Patent Document 5 is configured to include four cells having open inlets (they may be called "inflow cells" hereinafter) that surround one cell having an open outlet (this may be called an "outflow cell" hereinafter). The honeycomb filter described in Patent Document 5 therefore has two types of partition walls including "a partition wall disposed between an inflow cell and an outflow cell" and "a partition wall disposed between inflow cells".

Such a honeycomb filter typically has a tendency of less exhaust gas flowing through the "partition wall disposed between inflow cells" than through the "partition wall disposed between an inflow cell and an outflow cell". A honeycomb filter as described in Patent Document 5 therefore may have a problem of non-uniform flow of exhaust gas between these two types of partition walls, and so of an increase in pressure loss of the honeycomb filter.

In view of such problems of the conventional techniques, the present invention provides a honeycomb filter having low pressure loss while maintaining the isostatic strength.

The present invention provides the following honeycomb filter.

According to a first aspect of the present invention, a honeycomb filter is provided, including: a pillar-shaped honeycomb substrate having an inflow end face and an outflow end face and including a porous partition wall that surrounds a plurality of cells extending from the inflow end face to the outflow end face; and a plugging portion disposed at any one of ends of the cells at the inflow end face and at the outflow end face, wherein in a cross section orthogonal to an extending direction of the cells, inflow cells having the plugging portion at the ends of the outflow end face have a pentagonal or a hexagonal shape, outflow cells having the plugging portion at the ends of the inflow end face have a square shape, the plurality of cells is configured so that a plurality of the inflow cells surrounds one outflow cell and one side of an inflow cell and one side of an adjacent outflow cell are parallel to each other, and the partition wall is configured so that thickness T1 of a first partition wall disposed between the inflow cells and the outflow cells is smaller than thickness T2 of a second partition wall disposed between the inflow cells.

According to a second aspect of the present invention, the honeycomb filter according to the first aspect is provided, wherein a value of ratio (T2/T1) of the thickness T2 of the second partition wall to the thickness T1 of the first partition wall is 1.05 to 2.95.

According to a third aspect of the present invention, the honeycomb filter according to the second aspect provided, wherein the value of ratio (T2/T1) of the thickness T2 of the second partition wall to the thickness T1 of the first partition wall is 1.1 to 2.15.

According to a fourth aspect of the present invention, the honeycomb filter according to any one of the first to third aspects is provided, wherein the second partition wall has an inclined part in thickness, and at the inclined part in thickness, the thickness T2 of the second partition wall decreases or increases toward an intersection with the first partition wall.

According to a fifth aspect of the present invention, the honeycomb filter according to any one of the first to fourth aspects is provided, wherein the thickness T1 of the first partition wall is 70 to 300 μm.

According to a sixth aspect of the present invention, the honeycomb filter according to any one of the first to fifth aspects is provided, wherein the inflow cells have a smaller hydraulic diameter than a hydraulic diameter of the outflow cells.

According to a seventh aspect of the present invention, the honeycomb structure according to any one of the first to sixth aspects is provided, wherein the outflow cells have a length of one side of 0.6 to 3.0 mm.

According to an eight aspect of the present invention the honeycomb filter according to any one of the first to seventh aspects is provided, wherein the partition wall has porosity of 35 to 70%.

According to a ninth aspect of the present invention, the honeycomb filter according to the eight aspect is provided, wherein the partition wall has porosity of 50 to 70%.

According to a tenth aspect of the present invention, the honeycomb filter according to any one of the first to ninth aspects is provided, wherein in a cross section orthogonal to an extending direction of the cells, the honeycomb filter has a configuration of four of the inflow cells having a hexagonal shape surrounding one of the outflow cells or the honeycomb filter has a configuration of eight of the inflow cells having a pentagonal shape surrounding one of the outflow cells.

A honeycomb filter of the present invention is configured to include a first partition wall disposed between an inflow cell and an outflow cell and having thickness T1 and a second partition wall disposed between inflow cells and having thickness T2, and T1 is smaller than T2. That is, the honeycomb filter of the present invention satisfies the relationship of "T2>T1". With this configuration, the honeycomb filter of the present invention can have an advantageous effect of having low pressure loss as compared with an existing honeycomb filter having the same open frontal area while maintaining the isostatic strength equal to such an existing honeycomb filter.

That is, such a second partition wall having relatively large thickness T2 can increase the total volume of pores in the second partition wall relatively, and therefore exhaust gas can easily flow through the pores of the second partition wall. This allows exhaust gas flowing into the inflow cells to easily flow to the outflow cells via the pores of the second partition wall, even when PMs, such as soot, are accumulated on the surface of the first partition wall and so the first partition wall has increased permeation resistance. Thereby the honeycomb filter can have low pressure loss. Especially exhaust gas flowing from inflow cells to outflow cells mainly passes through the first partition wall, and so PMs, such as soot, are easily accumulated on the first partition wall. As PMs are accumulated, the permeation resistance easily increases at the first partition wall. According to the honeycomb filter of the present invention, when the permeation resistance increases at the first partition wall, the second partition wall can function as the through channel of exhaust gas very effectively.

Note here that contribution to an increase in pressure loss at the initial state of the operation is lower at the second partition wall than at the first partition wall. This means that a honeycomb filter including such a second partition wall having relatively large thickness T2 can suppress an increase in pressure loss at the initial state of the operation. Such a honeycomb filter including a second partition wall having relatively large thickness T2 can increase the heat capacity of the honeycomb filter as a whole and so the improved thermal shock resistance also can be expected.

DESCRIPTION OF THE PREFERRED EMBODIMENTS

The following describes embodiments of the present invention. The present invention is not limited to the following embodiments. The present invention is therefore to be understood to include the following embodiments, to which modifications and improvements are added as needed based on the ordinary knowledge of a person skilled in the art without departing from the scope of the present invention.

Figure 1:
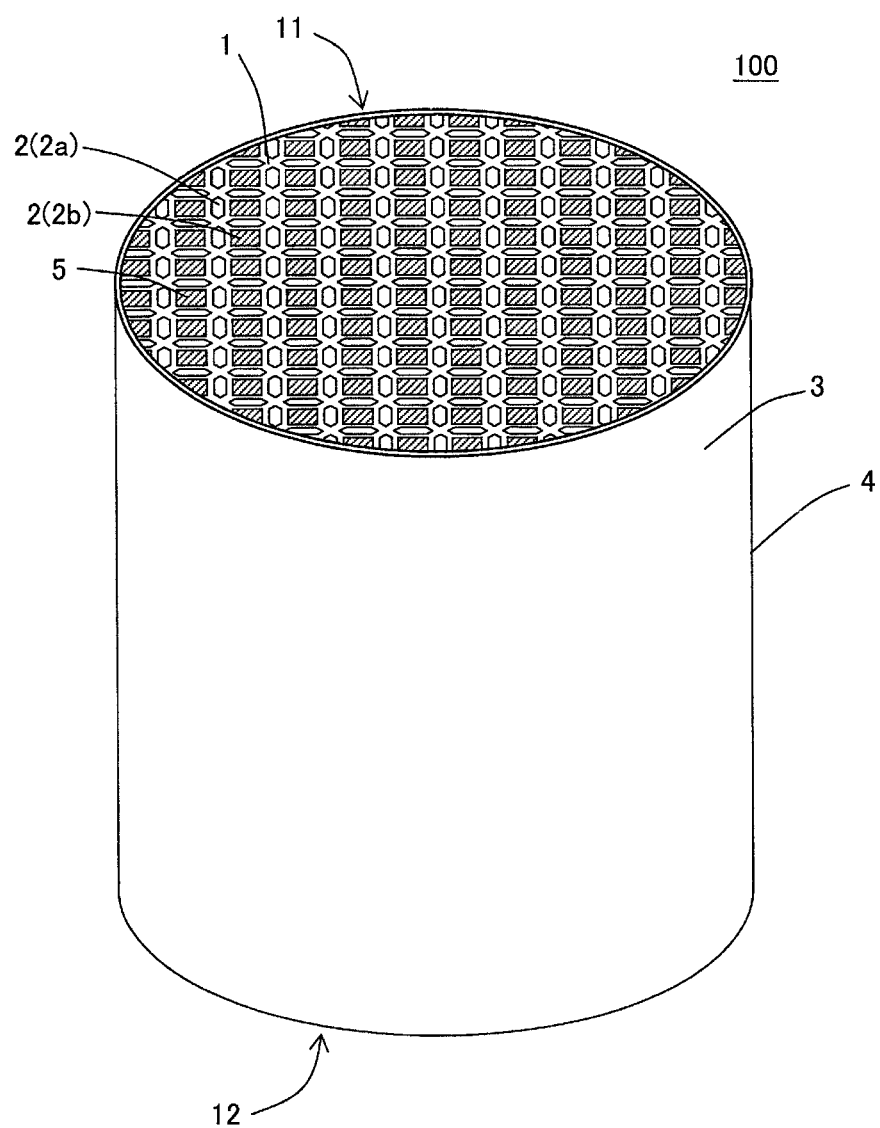
FIG. 1 is a perspective view schematically showing one embodiment of a honeycomb filter of the present invention viewed from the inflow end face.
Figure 2:
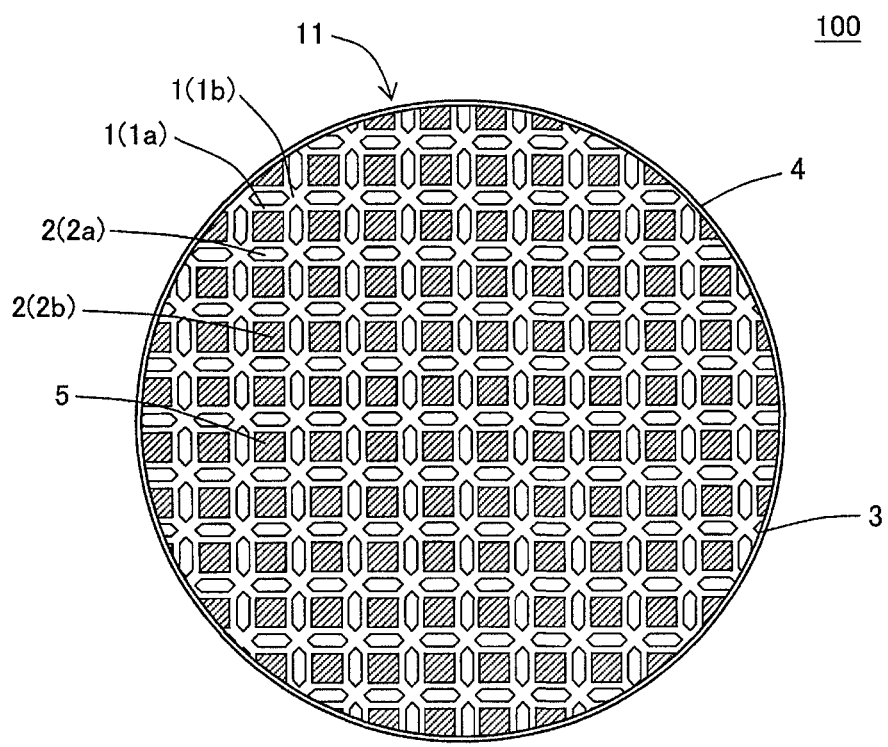
FIG. 2 is a plan view schematically showing the inflow end face of the honeycomb filter of FIG. 1.
Figure 3:
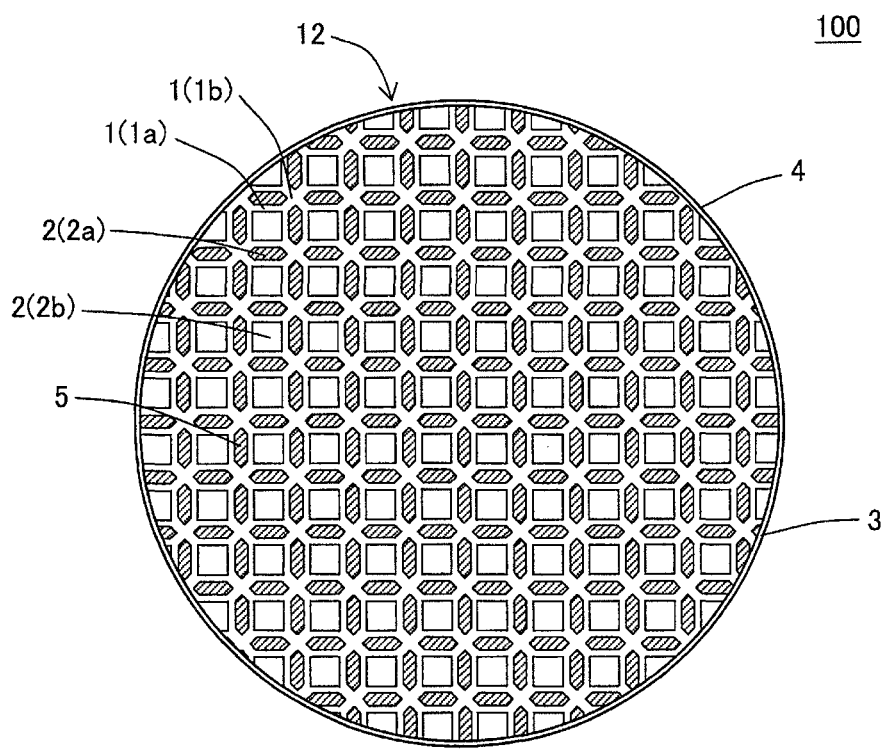
FIG. 3 is a plan view schematically showing the outflow end face of the honeycomb filter of FIG. 1.
Figure 4:
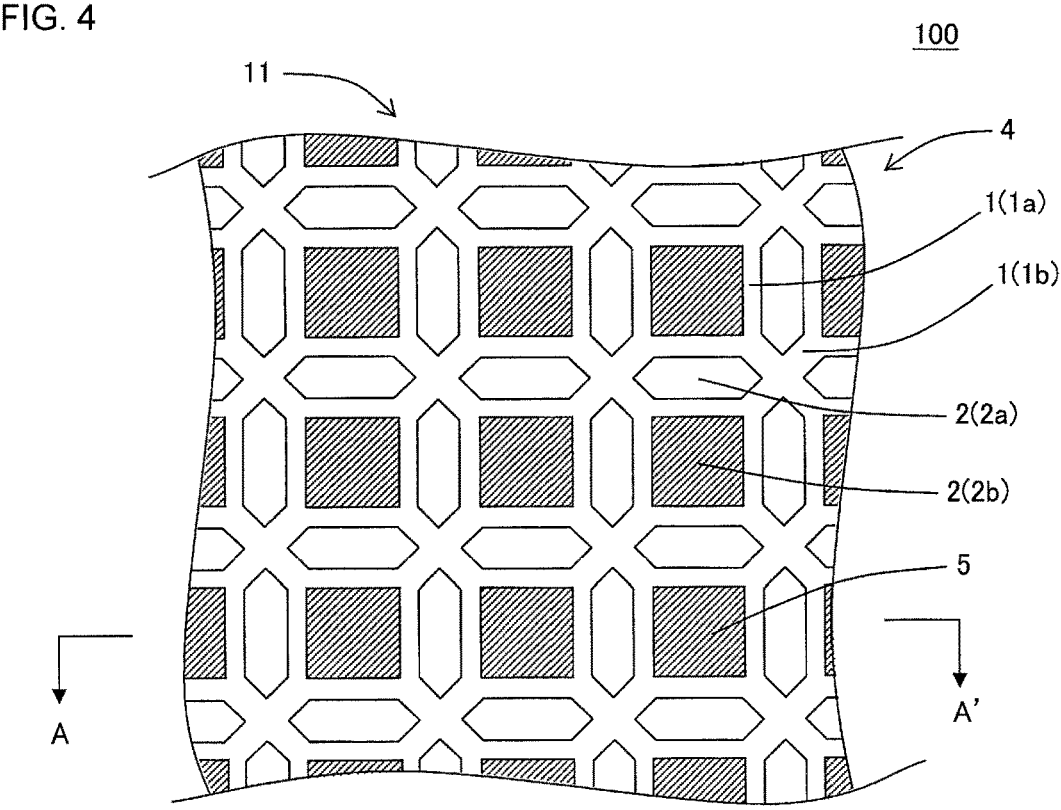
FIG. 4 is an enlarged plan view of a part of the inflow end face in FIG. 2.
Figure 5:
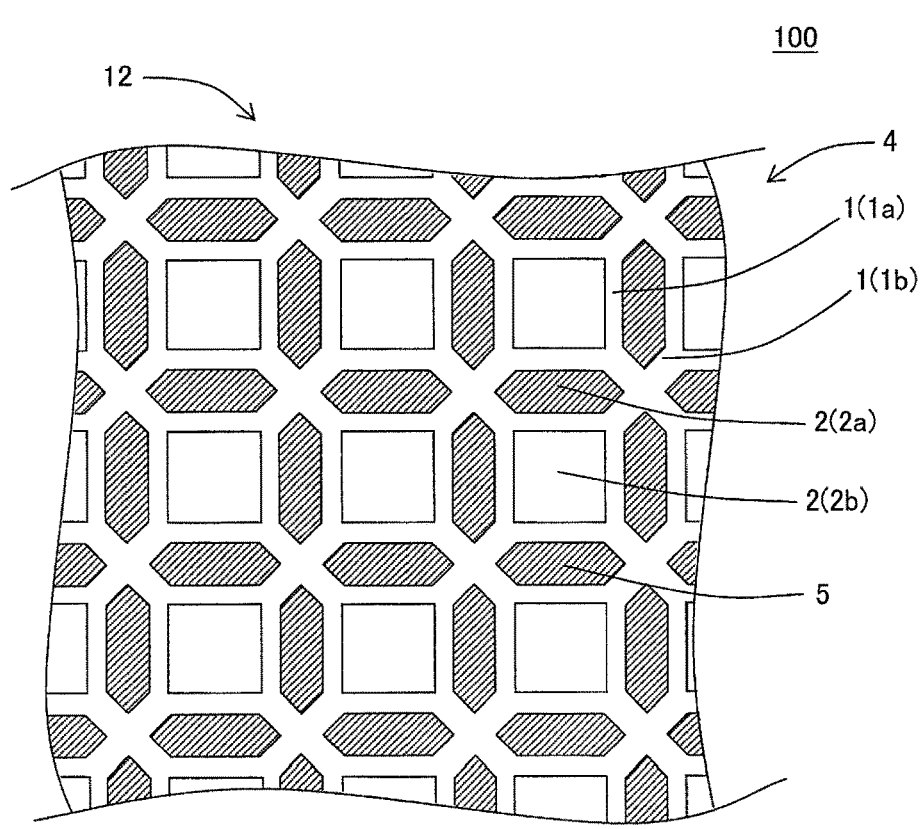
FIG. 5 is an enlarged plan view of a part of the outflow end face in FIG. 3.
Figure 6:
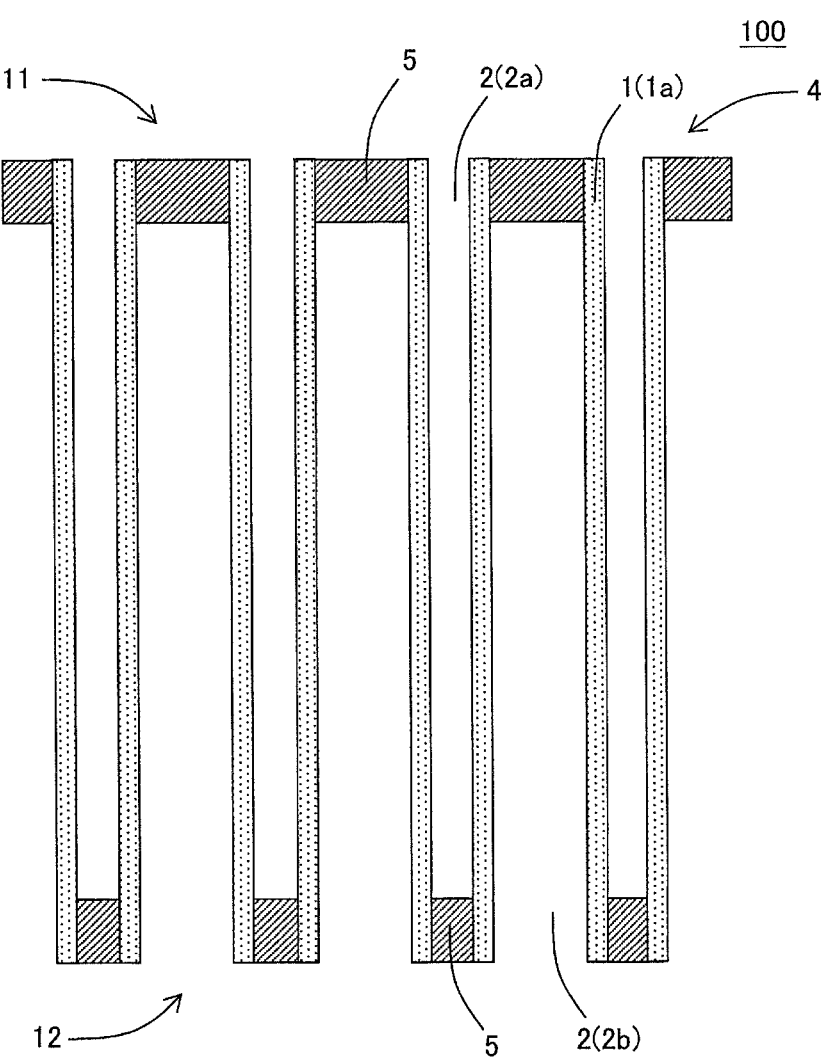
FIG. 6 is a schematic cross-sectional view taken along the line A-A' of FIG. 4.
Figure 7:
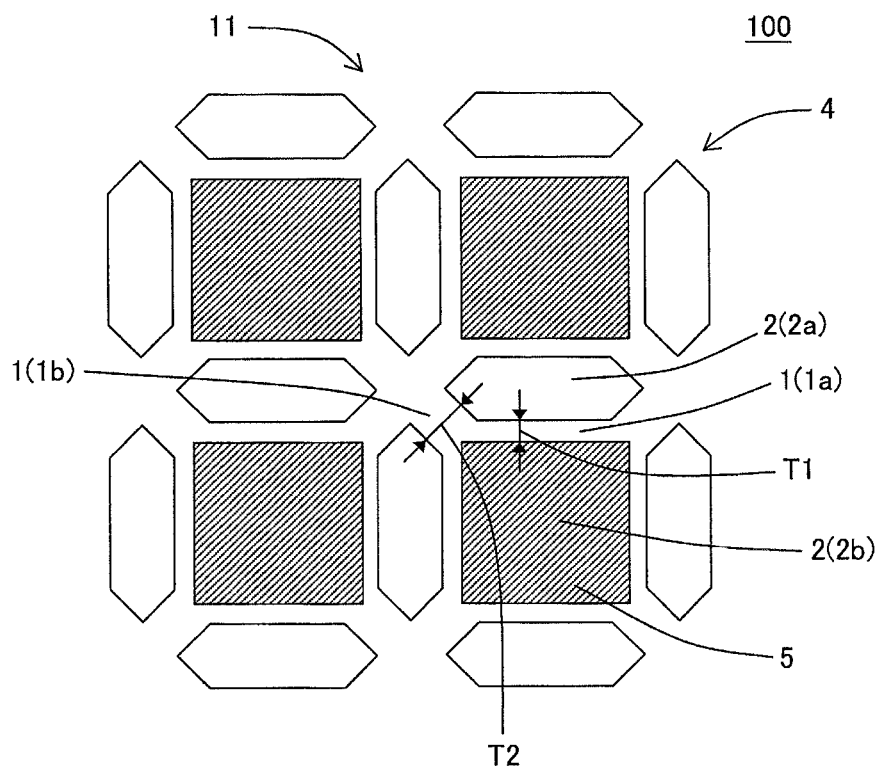
FIG. 7 schematically describes the shape of cells in FIG. 4.
Figure 8:
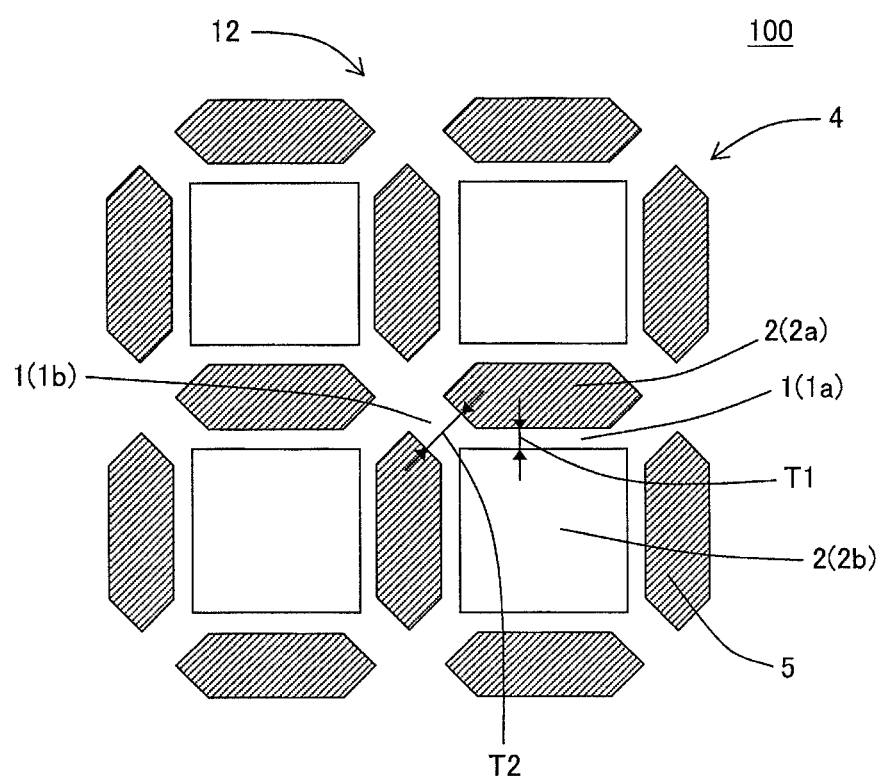
FIG. 8 schematically describes the shape of cells in FIG. 5.

(1) Honeycomb Filter:

One embodiment of the honeycomb filter of the present invention is a honeycomb filter 100 as shown in FIGS. 1 to 8. FIG. 1 is a perspective view schematically showing one embodiment of the honeycomb filter of the present invention viewed from the inflow end face. FIG. 2 is a plan view schematically showing the inflow end face of the honeycomb filter of FIG. 1. FIG. 3 is a plan view schematically showing the outflow end face of the honeycomb filter of FIG. 1. FIG. 4 is an enlarged plan view of a part of the inflow end face in FIG. 2. FIG. 5 is an enlarged plan view of a part of the outflow end face in FIG. 3. FIG. 6 is a schematic cross-sectional view taken along the line A-A' of FIG. 4. FIG. 7 schematically describes the shape of cells in FIG. 4. FIG. 8 schematically describes the shape of cells in FIG. 5.

The honeycomb filter 100 includes a honeycomb substrate 4 and a plugging portion 5. The honeycomb substrate 4 has a pillar shape having an inflow end face 11 and an outflow end face 12. The honeycomb substrate 4 includes a porous partition wall 1 that surrounds a plurality of cells 2 extending from the inflow end face 11 to the outflow end face 12. The honeycomb substrate 4 in FIGS. 1 to 3 further includes a circumferential wall 3 disposed so as to surround the partition wall 1. In the present invention, cells 2 refer to a space surrounded with the partition wall 1.

The plugging portion 5 is disposed at ends of the cells 2 formed in the honeycomb substrate 4 at any one of the inflow end face 11 and the outflow end face 12 so as to plug the open ends of the cells 2. Hereinafter the cells 2 having the plugging portion 5 at the ends of the outflow end face 12 are called "inflow cells 2a". The cells 2 having the plugging portion 5 at the ends of the inflow end face 11 are called "outflow cells 2b".

In the honeycomb filter 100 of the present embodiment, the inflow cells 2a and the outflow cells 2b have different shapes in a cross section orthogonal to the extending direction of the cells 2. The shape of the inflow cells 2a is a pentagon or a hexagon. The shape of the outflow cells 2b is a square. Hereinafter the "shape of the cells" in a cross section orthogonal to the extending direction of the cells 2 may be called a "cross-sectional shape of the cells" or simply a "shape of the cells". In this specification, a "pentagon" a "hexagon" and a "square" as stated above mean a "substantial pentagon", a "substantial hexagon" and a "substantial square", respectively, as described later.

A plurality of cells 2 is configured so that a plurality of inflow cells 2a surrounds one outflow cell 2b and one side of an inflow cell 2a and one side of an adjacent outflow cell 2b are parallel to each other. In the honeycomb filter 100 shown in FIGS. 1 to 8, four hexagonal inflow cells 2a surround one outflow cell 2b. In this specification, "parallel" as described above means "substantial parallel" as described later.

In the honeycomb filter 100, a part of the partition wall 1 disposed between an inflow cell 2a and an outflow cell 2b is called a "first partition wall 1a". A part of the partition wall 1 disposed between inflow cells 2a is called a "second partition wall 1b". The honeycomb filter 100 of the present embodiment has a major feature that thickness T1 of the first partition wall 1a is smaller than thickness T2 of the second partition wall 1b.

The honeycomb filter 100 of the present embodiment has an advantageous effect of having low pressure loss as compared with an existing honeycomb filter having the same open frontal area while maintaining the isostatic strength equal to such an existing honeycomb filter. That is, such a second partition wall 1b having relatively large thickness T2 can increase the total volume of pores in the second partition wall 1b relatively, and therefore exhaust gas can easily flow through the pores of the second partition wall 1b. This allows exhaust gas flowing into the inflow cells 2a to easily flow to the outflow cells 2b via the pores of the second partition wall 1b, even when PMs, such as soot, are accumulated on the surface of the first partition wall 1a and so the first partition wall 1a has increased permeation resistance. Thereby the honeycomb filter 100 can have low pressure loss. Especially exhaust gas flowing from inflow cells 2a to outflow cells 2b mainly passes through the first partition wall 1a, and so PMs, such as soot, are easily accumulated on the first partition wall. As PMs are accumulated, the permeation resistance easily increases at the first partition wall. According to the honeycomb filter 100 of the present embodiment, when the permeation resistance increases at the first partition wall 1a, the second partition wall 1b can function as the through channel of exhaust gas very effectively.

Note here that contribution to an increase in pressure loss at the initial state of the operation is lower at the second partition wall 1b than at the first partition wall 1a. This means that a honeycomb filter 100 including such a second partition wall 1b having relatively large thickness T2 can suppress an increase in pressure loss at the initial state of the operation. Such a honeycomb filter 100 including a second partition wall 1b having relatively large thickness T2 can increase the heat capacity of the honeycomb filter as a whole and so the improved thermal shock resistance also can be expected.

In this specification, a "substantial pentagon" means a pentagonal shape, a pentagonal shape having at least one curved corner of the pentagon, and a pentagonal shape having at least one corner of the pentagon that is linearly chamfered. When a second partition wall disposed between inflow cells has an "inclined part in thickness" as described later, these inflow cells are assumed to have a shape obtained by considering the two sides making up the "inclined part in thickness" as parallel two sides. A "substantial hexagon" means a hexagonal shape, a hexagonal shape having at least one curved corner of the hexagon, and a hexagonal shape having at least one corner of the hexagon that is linearly chamfered. A "substantial square" means a square shape, a square shape having at least one curved corner of the square, and a square shape having at least one corner of the square that is linearly chamfered. "Substantial parallel" means the positional relationship between two sides that are parallel and between parallel two sides, one of which is inclined within the range of ±15°.

In the honeycomb filter of the present embodiment, the thickness of the partition wall 1 at the parts of the first partition wall 1a and of the second partition wall 1b is not limited especially as long as T1 is smaller than T2 as shown in FIGS. 7 and 8. It should be noted that the value of "T2/T1" as the ratio of thickness T2 of the second partition wall 1b to thickness T1 of the first partition wall 1a is 1.05 to 2.95 preferably, more preferably 1.10 to 2.15, still more preferably 1.15 to 2.15 and particularly preferably 1.15 to 1.70. If the value of "T2/T1" is less than 1.05, the amount of exhaust gas flowing through the pores of the second partition wall 1b cannot be enough, which may lead to the failure of achieving a sufficient effect of lowering the pressure loss. If the value of "T2/T1" exceeds 2.95, the thickness of the second partition wall 1b is relatively too large, which decreases the open frontal area of the honeycomb filter 100 and may lead to the failure of achieving a sufficient effect of lowering the pressure loss.

Thickness T1 of the first partition wall 1a preferably is 70 to 300 µm, more preferably 120 to 280 µm, and particularly preferably 170 to 260 µm. The thus configured honeycomb filter 100 can have low pressure loss while maintaining the isostatic strength.

Thickness T1 of the first partition wall 1a and thickness T2 of the second partition wall 1b can be measured with a microscope. For the microscope, VHK-1000 (product name) produced by Keyence Corporation may be used, for example. Specifically the honeycomb filter 100 is firstly cut to be orthogonal to the extending direction of the cells 2. Then the first partition wall 1a and the second partition wall 1b on the cut plane of the honeycomb filter 100 are observed with a microscope to measure their thicknesses. At this time, "thickness T1 of the first partition wall 1a" is a thickness of the thinnest part of the first partition wall 1a between one side of an inflow cell 2a and one side of an adjacent outflow cell 2b. Similarly "thickness T2 of the second partition wall 1b" is a thickness of the thinnest part of the second partition wall 1b between two inflow cells.

In the honeycomb filter 100 of the present embodiment, hydraulic diameter is preferably smaller at the inflow cells 2a than at the outflow cells 2b. The thus configured honeycomb filter can easily have an advantageous effect of lowering pressure loss while maintaining the isostatic strength. Hydraulic diameter is a calculated value based on the cross-sectional area and the perimeter of each cell 2 by 4×(cross-sectional area)/(perimeter).

The hydraulic diameter of the inflow cells 2a is preferably 0.70 to 1.30 mm, more preferably 0.85 to 1.15 mm, and particularly preferably 0.90 to 1.10 mm. Preferably the hydraulic diameter of the inflow cells 2a is 0.50 to 1.30 times the hydraulic diameter of the outflow cells 2b, more preferably 0.75 to 0.95 times.

Preferably the outflow cells 2b have the length of one side that is 0.6 to 3.0 mm, more preferably 0.6 to 2.0 mm, and particularly preferably 0.7 to 1.5 mm. The thus configured honeycomb filter can easily have an advantageous effect of lowering pressure loss while having improved thermal shock resistance.

Preferably the partition wall 1 of the honeycomb substrate 4 has porosity of 35 to 70%, and more preferably 50 to 70%. If the porosity of the partition wall 1 is less than 35%, the pressure loss may increase. If the porosity of the partition wall 1 exceeds 70%, the strength of the honeycomb substrate 4 is not enough. When such a honeycomb filter 100 is stored in a casing used for an exhaust-gas purifying apparatus, it is difficult to hold the honeycomb filter 100 with a sufficient grip force. The porosity of the partition wall 1 is a value measured with a mercury porosimeter. For the mercury porosimeter, Autopore 9500 (product name) produced by Micromeritics Co. may be used, for example.

From the viewpoint of strength, heat resistance, durability, and the like, the partition wall 1 is preferably made of various types of ceramics, such as oxides and non-oxides, and metals as major components. Specifically, ceramics preferably include at least one type of materials selected from the group consisting of cordierite, mullite, alumina, spinel, silicon carbide, silicon nitride, and aluminum titanate. Examples of the metals include Fe—Cr—Al based metals and metal silicon. One type or two types or more selected from these materials may be included as a major component. Particularly preferably, one type or two types or more selected from the group consisting of alumina, mullite, aluminum titanate, cordierite, silicon carbide, and silicon nitride is included as a major component from the viewpoints of high strength and high heat resistance. The ceramic material may be a composite material obtained by binding silicon carbide particles with cordierite as a binder, for example. Silicon carbide or silicon-silicon carbide composite materials are particularly suitable from the viewpoints of high heat conductivity and high heat resistance. Herein, the "major component" refers to a component making up 50 mass % or more of the components, preferably 70 mass % or more, and more preferably 80 mass % or more.

The material of the plugging portion 5 is not limited especially, and a material mentioned in the above for the partition wall 1 can be used favorably.

The overall shape of the honeycomb filter is not limited especially. For the overall shape of the honeycomb filter of the present embodiment, the inflow end face and the outflow end face preferably have a circular shape or an elliptic shape, and preferably have a circular shape. The size of the honeycomb filter is not limited especially, and the length from the inflow end face to the outflow end face is preferably 50 to 300 mm. When the overall shape of the honeycomb filter is a round pillar-shape, their end faces preferably have a diameter of 100 to 400 mm.

The honeycomb filter of the present embodiment is favorably used as a member for exhaust-gas purification in an internal combustion engine. In the honeycomb filter of the present embodiment, at least one of the surface of the partition wall and the pores of the partition wall of the honeycomb substrate may be loaded with catalyst for exhaust-gas purification.

Figure 9:
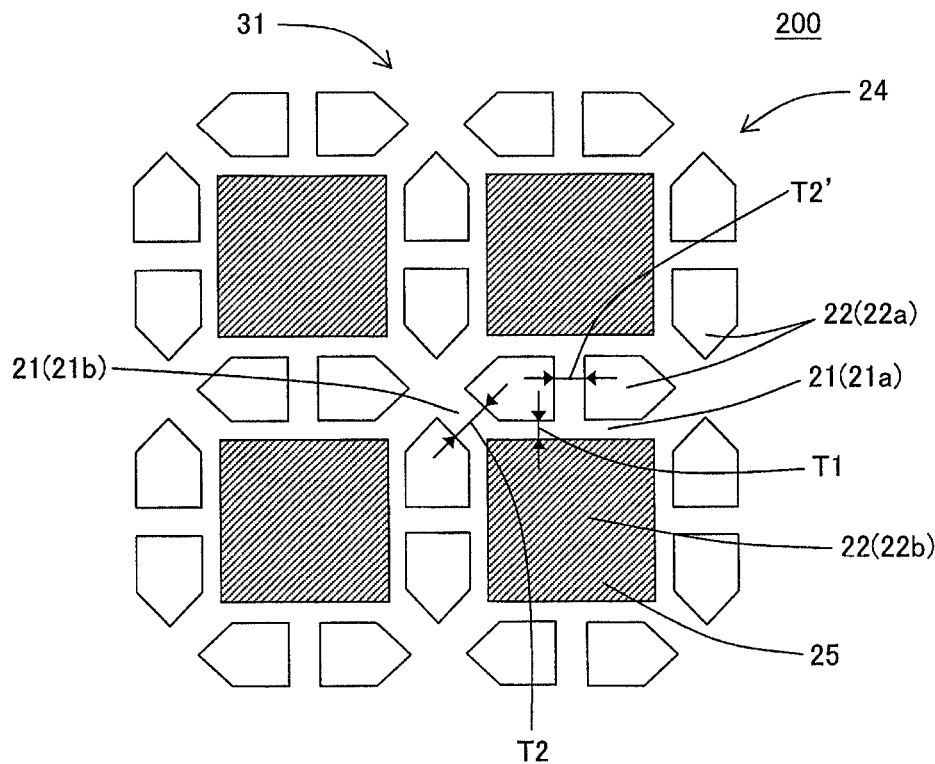
FIG. 9 is a schematic view to explain the shape of cells in another embodiment of the honeycomb filter according to the present invention.
Figure 10:
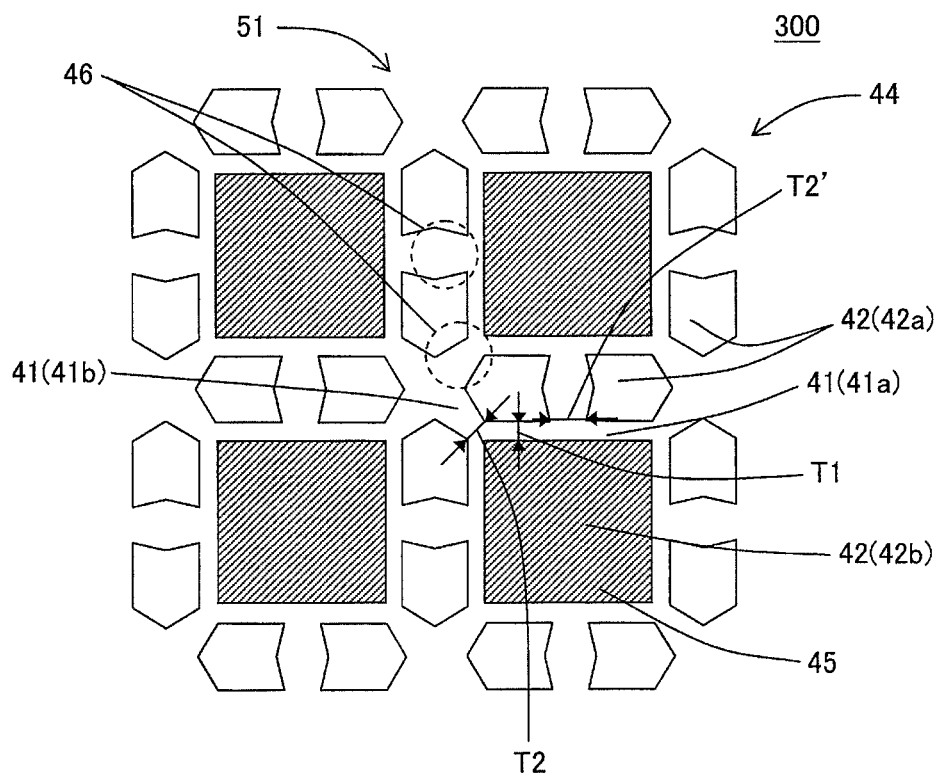
FIG. 10 is a schematic view to explain the shape of cells in another embodiment of the honeycomb filter according to the present invention.
Figure 11:
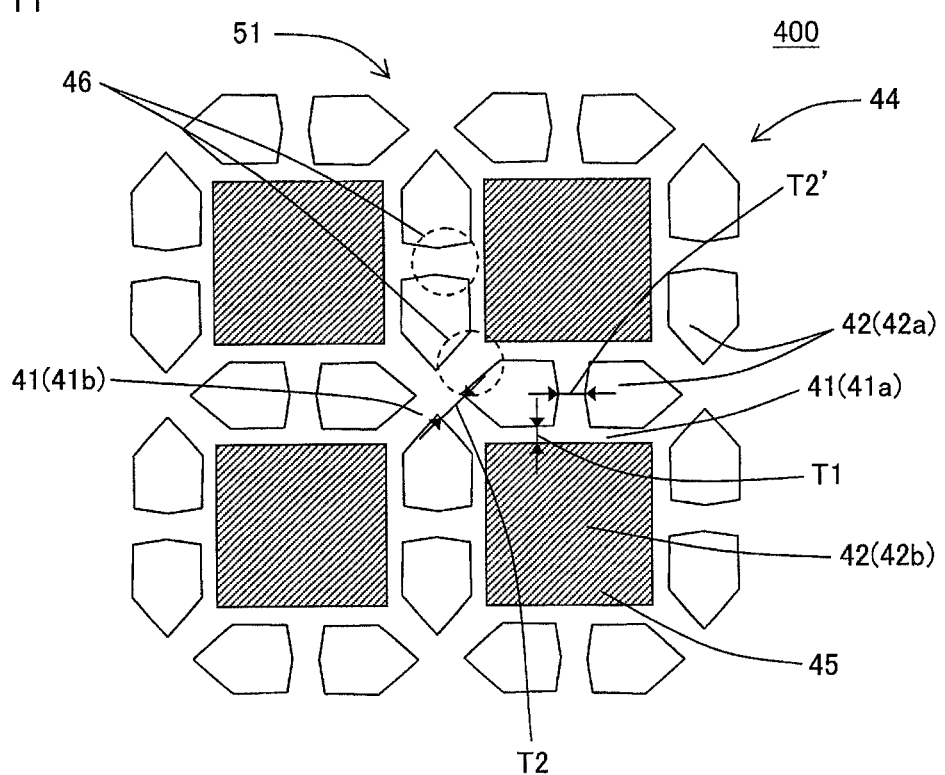
FIG. 11 is a schematic view to explain the shape of cells in another embodiment of the honeycomb filter according to the present invention.

The following describes another embodiment of the honeycomb filter of the present invention, with reference to FIGS. 9 to 11. FIG. 9 is a schematic view to explain the shape of cells in another embodiment of the honeycomb filter according to the present invention. FIG. 10 is a schematic view to explain the shape of cells in another embodiment of the honeycomb filter according to the present invention. FIG. 11 is a schematic view to explain the shape of cells in another embodiment of the honeycomb filter according to the present invention.

A honeycomb filter 200 in FIG. 9 includes a honeycomb substrate 24 and a plugging portion 25. The honeycomb substrate 24 has a pillar shape having an inflow end face 31 and an outflow end face (not illustrated). The honeycomb substrate 24 includes a porous partition wall 21 that surrounds a plurality of cells 22 extending from the inflow end face 31 to the outflow end face (not illustrated).

In the honeycomb filter 200 shown in FIG. 9, inflow cells 22*a* have a pentagonal shape and outflow cells 22*b* have a square shape in a cross section orthogonal to the extending direction of the cells 22. In the honeycomb filter 200, eight pentagonal inflow cells 22*a* surround one outflow cell 22*b*.

The honeycomb filter 200 is configured so that thickness T1 of the first partition wall 21*a* disposed between an inflow cell 22*a* and an outflow cell 22*b* is smaller than thickness T2 of the second partition wall 21*b* disposed between inflow cells 22*a*.

The thus configured honeycomb filter 200 also has an advantageous effect of having low pressure loss as compared with an existing honeycomb filter having the same open frontal area while maintaining the isostatic strength equal to such an existing honeycomb filter. The honeycomb filter 200 is configured so that each of the eight parts of the second partition walls 21*b* intersects with the first partition wall 21*a* surrounding one outflow cell 22*b*. With this configuration, a larger effect can be expected from this honeycomb filter when the second partition wall 21*b* functions as the through channel of exhaust gas.

The honeycomb filter 200 is preferably configured similarly to the honeycomb filter 100 shown in FIGS. 1 to 8 as stated above other than that the shape of the inflow cells 22*a* is a pentagon.

A honeycomb filter 300 in FIG. 10 includes a honeycomb substrate 44 and a plugging portion 45. The honeycomb substrate 44 has a pillar shape having an inflow end face 51 and an outflow end face (not illustrated). The honeycomb substrate 44 includes a porous partition wall 41 that surrounds a plurality of cells 42 extending from the inflow end face 51 to the outflow end face (not illustrated).

In the honeycomb filter 300 shown in FIG. 10, inflow cells 42*a* have a pentagonal shape and outflow cells 42*b* have a square shape in a cross section orthogonal to the extending direction of the cells 42. In the honeycomb filter 300, eight pentagonal inflow cells 42*a* surround one outflow cell 42*b*.

The honeycomb filter 300 also is configured so that thickness T1 of the first partition wall 41*a* disposed between an inflow cell 42*a* and an outflow cell 42*b* is smaller than thickness T2, T2' of the second partition wall 41*b* disposed between inflow cells 42*a*.

The honeycomb filter 300 has an inclined part in thickness 46 at the second partition wall 41*b*, and at this inclined part in thickness 46, thickness T2 of the second partition wall 41*b* decreases toward the intersection with the first partition wall 41*a*. The honeycomb filter 300 with such an inclined part in thickness 46 can have improved thermal shock resistance. Specifically, since stress tends to be generated relatively at a cruciform part of the second partition wall 41*b*, such a cruciform part of the second partition wall 41*b* is relatively thickened, whereby the honeycomb filter can have improved structural strength. The thus configured honeycomb filter 300 can have improved thermal shock resistance during regeneration treatment to burn trapped PMs for removal.

In the honeycomb filter 400 shown in FIG. 11, inflow cells 42*a* have a pentagonal shape and outflow cells 42*b* have a square shape in a cross section orthogonal to the extending direction of the cells 42. In the honeycomb filter 300, eight pentagonal inflow cells 42*a* surround one outflow cell 42*b*.

The honeycomb filter 400 also is configured so that thickness T1 of the first partition wall 41*a* disposed between an inflow cell 42*a* and an outflow cell 42*b* is smaller than thickness T2, T2' of the second partition wall 41*b* disposed between inflow cells 42*a*.

The honeycomb filter 400 has an inclined part in thickness 46 at the second partition wall 41*b*, and at this inclined part in thickness 46, thickness T2 of the second partition wall 41*b* increases toward the intersection with the first partition wall 41*a*. The thus configured honeycomb filter 400 having such an inclined part in thickness 46 can have lower pressure loss. Additionally less PMs, such as soot, are accumulated at a cruciform part of the second partition wall 41*b*, which can suppress a rise in the maximum temperature during burning of PMs at the regeneration treatment to burn the PMs trapped with the honeycomb filter 400 for removal, and can improve thermal shock resistance of the honeycomb filter.

(2) Method for manufacturing honeycomb filter:

The following describes a method for manufacturing the honeycomb filter of the present invention.

Firstly a kneaded material having plasticity is prepared to produce a honeycomb substrate. The kneaded material to produce a honeycomb substrate can be prepared by adding additives, such as binder, and water as needed to a material selected as raw material powder from the aforementioned materials suitable for the partition wall.

Next, the thus prepared kneaded material is extruded, thus producing a pillar-shaped honeycomb formed body having a partition wall defining a plurality of cells and a circumferential wall disposed at the outermost circumference. In the extrusion, a die for the extrusion has an extruding face of the kneaded material, and the extruding face of the die may have a slit thereon in the reversed shape of the honeycomb formed body to be formed. The thus obtained honeycomb formed body may be dried by microwaves and hot air, for example.

Next, the open ends of the cells are plugged with a material similar to the material used for manufacturing of the honeycomb formed body, thus forming a plugging portion. A method for forming the plugging portion can follow a conventionally-known method for manufacturing a honeycomb filter.

Next, the thus obtained honeycomb formed body is fired, so as to obtain a honeycomb filter. Temperatures and atmosphere for the firing differ according to the raw material, and those skilled in the art can select the temperature and atmosphere for the firing that are the most suitable for the selected material. The method for manufacturing the honeycomb filter of the present invention is not limited to the method as described above.

EXAMPLES

Example 1

Firstly a kneaded material was prepared to produce a honeycomb substrate. In Example 1, for the raw material powder to prepare a kneaded material, silicon carbide (SiC) powder and metal silicon (Si) powder were mixed at the mass ratio of 80:20 to prepare a mixture powder. To the mixture powder, binder, a pore former and water were added to have a forming raw material. Next, the forming raw material was kneaded to have a round pillar-shaped kneaded material.

Next, the kneaded material was extruded using a die for manufacturing of a honeycomb formed body to have a honeycomb formed body having a round pillar shape as the overall shape.

Next, the honeycomb formed body was dried by a microwave dryer, and then was dried completely by a hot-air dryer, and then both end faces of the honeycomb formed body were cut so as to have predetermined dimensions.

Next, a plugging portion was formed to the dried honeycomb formed body. Specifically a mask was firstly applied to the inflow end face of the honeycomb formed body so as to cover the inflow cells. Subsequently the masked end of the honeycomb formed body was immersed in slurry for plugging to fill the open ends of the outflow cells without the mask with the slurry for plugging. Subsequently the outflow end face of the honeycomb formed body also was filled with slurry for plugging at the open ends of the inflow cells similarly to the above. Subsequently the honeycomb formed body having the plugging portion formed was further dried by a hot-air drier.

Next the honeycomb formed body having the plugging portion formed was degreased and fired, so as to obtain a honeycomb filter.

The honeycomb filter of Example 1 had a cell configuration as in the honeycomb filter 200 shown in FIG. 9, including eight pentagonal inflow cells 22*a* that surround a square outflow cell 22*b*. The honeycomb filter of Example 1 had porosity of the partition wall of 63%. The end faces had a diameter of 143.8 mm and the length in the cell extending direction was 152.4 mm. The porosity of the partition wall is a value measured with a mercury porosimeter. The honeycomb filter of Example 1 had thickness T1 of the first partition wall 21*a* of 248 μm and thickness T2 of the second partition wall 21*b* of 260 μm shown in FIG. 9. Therefore the honeycomb filter of Example 1 had the value of ratio (T2/T1) of thickness T2 of the second partition wall to thickness T1 of the first partition wall that was 1.05. Table 1 shows the values of "thickness T1 of first partition wall (μm)", "thickness T2 of second partition wall (μm)", and "T2/T1".

TABLE 1

| | Thickness T1 of 1st partition wall (μm) | Thickness T2 of 2nd partition wall (μm) | T2/T1 | Pressure loss Amount of soot | | | Thermal shock resistance |
|---|---|---|---|---|---|---|---|
| | | | | 0 g/L | 4 g/L | 8 g/L | |
| Comp. Ex.1 | 250 | 250 | 1.00 | Reference | Reference | Reference | good |
| Ex.1 | 248 | 260 | 1.05 | −5% | −5% | −5% | good |
| Ex.2 | 246 | 271 | 1.10 | −10% | −10% | −10% | good |
| Ex.3 | 244 | 281 | 1.15 | −15% | −15% | −15% | good |
| Ex.4 | 242 | 290 | 1.20 | −20% | −20% | −20% | excellent |

TABLE 1-continued

| | Thickness T1 of 1st partition wall (μm) | Thickness T2 of 2nd partition wall (μm) | T2/T1 | Pressure loss Amount of soot | | | Thermal shock resistance |
| --- | --- | --- | --- | --- | --- | --- | --- |
| | | | | 0 g/L | 4 g/L | 8 g/L | |
| Ex.5 | 240 | 300 | 1.25 | −25% | −25% | −25% | excellent |
| Ex.6 | 238 | 309 | 130 | −20% | −20% | −20% | excellent |
| Ex.7 | 236 | 319 | 1.35 | −19% | −19% | −19% | excellent |
| Ex.8 | 234 | 328 | 1.40 | −19% | −19% | −19% | excellent |
| Ex.9 | 232 | 336 | 1.45 | −18% | −18% | −18% | excellent |
| Ex.10 | 230 | 345 | 1.50 | −18% | −18% | −18% | excellent |
| Ex.11 | 228 | 353 | 1.55 | −17% | −17% | −17% | excellent |
| Ex.12 | 226 | 362 | 1.60 | −16% | −16% | −16% | excellent |
| Ex.13 | 224 | 370 | 1.65 | −16% | −16% | −16% | excellent |
| Ex.14 | 222 | 377 | 1.70 | −15% | −15% | −15% | good |
| Ex.15 | 220 | 385 | 1.75 | −15% | −15% | −15% | good |
| Ex.16 | 218 | 392 | 1.80 | −14% | −14% | −14% | good |
| Ex.17 | 216 | 400 | 1.85 | −13% | −13% | −13% | good |
| Ex.18 | 214 | 407 | 1.90 | −13% | −13% | −13% | good |
| Ex.19 | 212 | 413 | 1.95 | −12% | −12% | −12% | good |
| Ex.20 | 210 | 420 | 2.00 | −12% | −12% | −12% | good |
| Ex.21 | 208 | 437 | 2.10 | −10% | −10% | −10% | good |
| Ex.22 | 206 | 453 | 2.20 | −9% | −9% | −9% | good |
| Ex.23 | 204 | 469 | 2.30 | −8% | −8% | −8% | good |
| Ex.24 | 202 | 485 | 2.40 | −7% | −7% | −7% | good |
| Ex.25 | 200 | 500 | 2.50 | −6% | −6% | −6% | good |
| Ex.26 | 198 | 515 | 2.60 | −4% | −4% | −4% | good |
| Ex.27 | 196 | 529 | 2.70 | −3% | −3% | −3% | good |
| Ex.28 | 194 | 543 | 2.80 | −2% | −2% | −2% | good |
| Ex.29 | 192 | 557 | 2.90 | −1% | −1% | −1% | good |
| Ex.30 | 190 | 561 | 2.95 | −1% | −1% | −1% | good |

For the honeycomb filter of Example 1, the "pressure loss" and the "thermal shock resistance" were evaluated by the following method. Table 1 shows the result.

(Evaluations on Pressure Loss)

Pressure loss of the honeycomb filters of Examples was evaluated using the value of pressure loss of "a honeycomb filter as the reference" as the reference value measured under the same condition. More specifically pressure loss was measured at the air volume of 10 m$^3$/min., using a large-sized wind-tunnel apparatus. Let that the value of pressure loss of the honeycomb filter as the reference was $P_0$ and the value of pressure loss of the honeycomb filter of each Example was $P_1$, the value calculated by $(P_1-P_0)/P_0 \times 100$ was obtained as the result of the pressure loss evaluation. In Examples 1 to 30, Comparative Example 1 was used as their reference honeycomb filter. In this measurement of pressure loss, three types of pressure loss was evaluated, including the pressure loss of a honeycomb filter without soot accumulated and the pressure loss of the honeycomb filter with 4 g/L and 8 g/L of soot accumulated. In Table 1, the result described in the field of "0 g/L" of "Amount of soot" indicates the result of evaluation about the pressure loss for each honeycomb filter without soot accumulated. In Table 1, the results described in the fields of "4 g/L" and "8 g/L" of "Amount of soot" indicate the results of evaluation about the pressure loss for each honeycomb filter with 4 g/L and 8 g/L, respectively, of soot accumulated.

(Thermal Shock Resistance)

Firstly using an engine bench coming with a 2.0-L diesel engine, a predetermined amount of soot was generated under a constant operating condition, and the generated soot was deposited on the surface of the partition wall of the honeycomb filters of Examples and Comparative Examples. Next, regeneration treatment was performed using postinjection to increase the inlet gas temperature of the honeycomb filter. When pressure loss measured before and after the honeycomb filter began to decrease, the postinjection was stopped, and the engine was switched to an idle state. The predetermined amount of soot deposition before regeneration treatment was gradually increased. This operation was repeated until cracks occurred at the honeycomb filters. The amount of soot deposition that caused cracks in the honeycomb filters was considered as "deposition limit of soot" of the honeycomb filters. "Deposition limit of soot" of the honeycomb filters was evaluated in accordance with the following criteria. In Examples 1 to 30, Comparative Example 1 was used as their reference honeycomb filter.

Evaluation "excellent": Let that the "deposition limit of soot" of the reference honeycomb filter is set at 100%, when the "deposition limit of soot" of a honeycomb filter to be evaluated is 110% or more, it is evaluated as "excellent".

Evaluation "good": Let that the "deposition limit of soot" of the reference honeycomb filter is set at 100%, when the "deposition limit of soot" of a honeycomb filter to be evaluated is 100% or more and less than 110%, it is evaluated as "good".

Evaluation "fail": Let that the "deposition limit of soot" of the reference honeycomb filter is set at 100%, when the "deposition limit of soot" of a honeycomb filter to be evaluated is less than 100%, it is evaluated as "fail".

Examples 2 to 30

Honeycomb filters of these Examples were manufactured similarly to Example 1 other than that "thickness T1 of the first partition wall (μm)", "thickness T2 of the second partition wall (μm)" and "T2/T1" were changed as shown in Table 1. For the honeycomb filters of Examples 2 to 30, the "pressure loss" and "thermal shock resistance" were evaluated by the method similar to Example 1. Table 1 shows the result.

Comparative Example 1

A honeycomb filter of this Comparative Example was manufactured similarly to Example 1 other than that "thickness T1 of the first partition wall (μm)", "thickness T2 of the second partition wall (μm)" and "T2/T1" were changed as shown in Table 1. That is, in Comparative Example 1, a honeycomb filter with thickness T1 of the first partition wall and thickness T2 of the second partition wall was manufactured so that T1 and T2 were the same value.

shows the result. In Examples 31 to 60, Comparative Example 2 described below was used as their reference honeycomb filter.

Comparative Example 2

A honeycomb filter of this Comparative Example was manufactured similarly to Example 31 other than that "thickness T1 of the first partition wall (μm)", "thickness T2 of the second partition wall (μm)" and "T2/T1" were changed as shown in Table 2. That is, in Comparative Example 2, a honeycomb filter with thickness T1 of the first partition wall and thickness T2 of the second partition wall was manufactured so that T1 and T2 were the same value.

TABLE 2

| | Thickness T1 of 1st partition wall (μm) | Thickness T2 of 2nd partition wall (μm) | T2/T1 | Pressure loss Amount of soot | | | Thermal shock resistance |
|---|---|---|---|---|---|---|---|
| | | | | 0 g/L | 4 g/L | 8 g/L | |
| Comp. Ex.2 | 250 | 250 | 1.00 | Reference | Reference | Reference | good |
| Ex.31 | 248 | 260 | 1.05 | −3% | −3% | −3% | good |
| Ex.32 | 246 | 271 | 1.10 | −5% | −5% | −5% | good |
| Ex.33 | 244 | 281 | 1.15 | −8% | −8% | −8% | good |
| Ex.34 | 242 | 290 | 1.20 | −10% | −10% | −10% | excellent |
| Ex.35 | 240 | 300 | 1.25 | −13% | −13% | −13% | excellent |
| Ex.36 | 238 | 309 | 1.30 | −10% | −10% | −10% | excellent |
| Ex.37 | 236 | 319 | 1.35 | −10% | −10% | −10% | excellent |
| Ex.38 | 234 | 328 | 1.40 | −9% | −9% | −9% | excellent |
| Ex.39 | 232 | 336 | 1.45 | −9% | −9% | −9% | excellent |
| Ex.40 | 230 | 345 | 1.50 | −9% | −9% | −9% | excellent |
| Ex.41 | 228 | 353 | 1.55 | −9% | −9% | −9% | excellent |
| Ex.42 | 226 | 362 | 1.60 | −8% | −8% | −8% | excellent |
| Ex.43 | 224 | 370 | 1.65 | −8% | −8% | −8% | excellent |
| Ex.44 | 222 | 377 | 1.70 | −8% | −8% | −8% | good |
| Ex.45 | 220 | 385 | 1.75 | −7% | −7% | −7% | good |
| Ex.46 | 218 | 392 | 1.80 | −7% | −7% | −7% | good |
| Ex.47 | 216 | 400 | 1.85 | −7% | −7% | −7% | good |
| Ex.48 | 214 | 407 | 1.90 | −6% | −6% | −6% | good |
| Ex.49 | 212 | 413 | 1.95 | −6% | −6% | −6% | good |
| Ex.50 | 210 | 420 | 2.00 | −6% | −6% | −6% | good |
| Ex.51 | 208 | 437 | 2.10 | −5% | −5% | −5% | good |
| Ex.52 | 206 | 453 | 2.20 | −5% | −5% | −5% | good |
| Ex.53 | 204 | 469 | 2.30 | −4% | −4% | −4% | good |
| Ex.54 | 202 | 485 | 2.40 | −3% | −3% | −3% | good |
| Ex.55 | 200 | 500 | 2.50 | −3% | −3% | −3% | good |
| Ex.56 | 198 | 515 | 2.60 | −2% | −2% | −2% | good |
| Ex.57 | 196 | 529 | 2.70 | −2% | −2% | −2% | good |
| Ex.58 | 194 | 543 | 2.80 | −1% | −1% | −1% | good |
| Ex.59 | 192 | 557 | 2.90 | 0% | 0% | 0% | good |
| Ex.60 | 190 | 561 | 2.95 | −1% | −1% | −1% | good |

Examples 31 to 60

In Examples 31 to 60, the amount of pore former was increased during the preparation of a kneaded material to manufacture a honeycomb substrate as compared with the kneaded material prepared in Example 1, so as to manufacture a honeycomb filter including the partition wall having the porosity of 41%. Honeycomb filters of these Examples were manufactured similarly to Example 1 other than that "thickness T1 of the first partition wall (μm)", "thickness T2 of the second partition wall (μm)" and "T2/T1" were changed as shown in Table 2 by using such a kneaded material. For the honeycomb filters of Examples 31 to 60, the "pressure loss" and "thermal shock resistance" were evaluated by the method similar to Example 1. Table 2

Examples 61 to 64

In Examples 61 to 64, a honeycomb filter as in the honeycomb filter 100 of FIG. 7 was manufactured, which had a cell configuration including four hexagonal inflow cells 2a that surrounded a square outflow cell 2b. Raw materials to manufacture these honeycomb filters were similar to those in Example 1. The honeycomb filters of Examples 61 to 64 had porosity of the partition wall of 63%. Table 3 shows the values of "thickness T1 of first partition wall (μm)", "thickness T2 of second partition wall (μm)", and "T2/T1" of the honeycomb filters of Examples 61 to 64. For the honeycomb filters of Examples 61 to 64, the "pressure loss" and "thermal shock resistance" were evaluated by the method similar to Example 1. Table 3 shows the result.

In Examples 61 to 64, Comparative Example 3 described below was used as their reference honeycomb filter.

Comparative Example 3

A honeycomb filter of this Comparative Example was manufactured similarly to Example 61 other than that "thickness T1 of the first partition wall (μm)", "thickness T2 of the second partition wall (μm)" and "T2/T1" were changed as shown in Table 3. That is, in Comparative Example 3, a honeycomb filter with thickness T1 of the first partition wall and thickness T2 of the second partition wall was manufactured so that T1 and T2 were the same value.

TABLE 3

| | Thickness T1 of 1st partition wall (μm) | Thickness T2 of 2nd partition wall (μm) | T2/T1 | Cell shape | Porosity | Pressure loss Amount of soot | | | Thermal shock resistance |
|---|---|---|---|---|---|---|---|---|---|
| | | | | | | 0 g/L | 4 g/L | 8 g/L | |
| Comp. Ex.3 | 330 | 330 | 1.00 | FIG. 7 | 63 | Reference | Reference | Reference | good |
| Ex.61 | 320 | 336 | 1.05 | FIG. 7 | 63 | −5% | −5% | −5% | excellent |
| Ex.62 | 310 | 372 | 1.20 | FIG. 7 | 63 | −20% | −20% | −20% | excellent |
| Ex.63 | 300 | 450 | 1.50 | FIG. 7 | 63 | −19% | −19% | −19% | excellent |
| Ex.64 | 200 | 400 | 2.00 | FIG. 7 | 63 | −19% | −19% | −19% | good |

Examples 65 to 68

In Examples 65 to 68, a honeycomb filter as in the honeycomb filter 300 of FIG. 10 was manufactured, which had a cell configuration including eight pentagonal inflow cells 42a surrounding a square outflow cell 42b. Raw materials to manufacture these honeycomb filters were similar to those in Example 1. The honeycomb filters of Examples 65 to 68 had porosity of the partition wall of 41%. The honeycomb filters of Examples 65 to 68 had an inclined part in thickness at the second partition wall, where thickness of the second partition wall gradually decreased toward the intersection with the first partition wall. Table 4 shows the values of "thickness T1 of first partition wall (μm)", "thickness T2 of second partition wall (μm)", and "T2/T1" of the honeycomb filters of Examples 65 to 68. For the honeycomb filters of Examples 65 to 68, the "pressure loss" and "thermal shock resistance" were evaluated by the method similar to Example 1. Table 4 shows the result. In Examples 65 to 68, Comparative Example 4 described below was used as their reference honeycomb filter.

Comparative Example 4

A honeycomb filter of this Comparative Example was manufactured similarly to Example 65 other than that "thickness T1 of the first partition wall (μm)", "thickness T2 of the second partition wall (μm)" and "T2/T1" were changed as shown in Table 4. That is, in Comparative Example 4, a honeycomb filter with thickness T1 of the first partition wall and thickness T2 of the second partition wall was manufactured so that T1 and T2 were the same value.

TABLE 4

| | Thickness T1 of 1st partition wall (μm) | Thickness T2 of 2nd partition wall (μm) | T2/T1 | Cell shape | Porosity | Pressure loss Amount of soot | | | Thermal shock resistance |
|---|---|---|---|---|---|---|---|---|---|
| | | | | | | 0 g/L | 4 g/L | 8 g/L | |
| Comp. Ex.4 | 330 | 330 | 1.00 | FIG. 10 | 41 | Reference | Reference | Reference | good |
| Ex.65 | 320 | 336 | 1.05 | FIG. 10 | 41 | −3% | −3% | −3% | excellent |
| Ex.66 | 310 | 372 | 1.20 | FIG. 10 | 41 | −10% | −10% | −10% | excellent |
| Ex.67 | 300 | 450 | 1.50 | FIG. 10 | 41 | −10% | −10% | −10% | excellent |
| Ex.68 | 200 | 400 | 2.00 | FIG. 10 | 41 | −9% | −9% | −9% | good |

(Results)

The honeycomb filters of Examples 1 to 68 had lower pressure loss than those of their reference honeycomb filters of Comparative Examples 1 to 4. That is, it was confirmed that the configuration having thickness T1 of the first partition wall smaller than thickness T2 of the second partition wall enabled such low pressure loss of the honeycomb filters. Additionally, the honeycomb filters of Examples 1 to 68 had excellent thermal shock resistance. The honeycomb filters of Examples 1 to 68 had isostatic strength equal to those of their reference honeycomb filters of Comparative Examples 1 to 4. The result of evaluations of pressure loss of the honeycomb filters of Examples 4 to 13 shows that the value of "T2/T1" within the range of 1.2 to 1.65 enabled lower pressure loss.

A honeycomb filter of the present invention can be used for a filter to purify exhaust gas.

DESCRIPTION OF REFERENCE NUMERALS 1, 21, 41: partition wall, 1a, 21a, 41a: first partition wall, 1b, 21b, 41b: second partition wall, 2, 22, 42: cell, 2a, 22a, 42a: inflow cell, 2b, 22b, 42b: outflow cell, 3: circumferential wall, 4, 24, 44: honeycomb substrate, 5, 25, 45: plugging portion, 46: inclined part in thickness, 11, 31, 51: inflow end face, 12: outflow end face, 100, 200, 300, 400: honeycomb filter, T1: thickness of first partition wall, T2, T2': thickness of second partition wall

What is claimed is:

1. A honeycomb filter, comprising: a pillar-shaped honeycomb substrate having an inflow end face and an outflow end face and including porous partition walls that surrounds a plurality of cells extending from the inflow end face to the outflow end face; and
a plugging portion disposed at any one of ends of the cells at the inflow end face and at the outflow end face,
wherein in a cross section orthogonal to an extending direction of the cells, inflow cells having the plugging portion at the ends of the outflow end face have a pentagonal or a hexagonal shape,
outflow cells having the plugging portion at the ends of the inflow end face have a square shape,
the plurality of cells is configured so that a plurality of the inflow cells surrounds one outflow cell and one side of an inflow cell and one side of an adjacent outflow cell are parallel to each other,
the partition walls includes first partition walls each with a thickness T1 disposed between the inflow cells and the outflow cells, and second partition walls each with a thickness T2 disposed between the inflow cells, and the thickness T1 of all of the first partition walls is smaller than the thickness T2 of all of the second partition walls.

2. The honeycomb filter according to claim 1, wherein a value of ratio (T2/T1) of the thickness T2 of the second partition wall to the thickness T1 of the first partition walls is 1.05 to 2.95.

3. The honeycomb filter according to claim 2, wherein the value of ratio (T2/T1) of the thickness T2 of the second partition walls to the thickness T1 of the first partition walls is 1.1 to 2.15.

4. The honeycomb filter according to claim 1, wherein each of the second partition walls have an inclined part in thickness, and at the inclined part in thickness, the thickness T2 of each of the second partition walls decreases or increases toward an intersection with each of the first partition walls.

5. The honeycomb filter according to claim 1, wherein the thickness T1 of each of the first partition wall is 70 to 300 μm.

6. The honeycomb filter according to claim 1, wherein the inflow cells have a smaller hydraulic diameter than a hydraulic diameter of the outflow cells.

7. The honeycomb structure according to claim 1, wherein the outflow cells have a length of one side of 0.6 to 3.0 mm.

8. The honeycomb filter according to claim 1, wherein the partition walls have porosity of 35 to 70%.

9. The honeycomb filter according to claim 8, wherein the partition wall have porosity of 50 to 70%.

10. The honeycomb filter according to claim 1, wherein in a cross section orthogonal to an extending direction of the cells,
the honeycomb filter has a configuration of four of the inflow cells having a hexagonal shape surrounding one of the outflow cells or the honeycomb filter has a configuration of eight of the inflow cells having a pentagonal shape surrounding one of the outflow cells.

* * * * *